(12) United States Patent
Vandenbelt et al.

(10) Patent No.: US 7,387,729 B2
(45) Date of Patent: Jun. 17, 2008

(54) FILTER CARTRIDGE FOR A STANDALONE POINT OF USE WATER PURIFICATION DEVICE

(75) Inventors: Rudy A. Vandenbelt, Ottawa (CA); Jeremy Hamilton, Ottawa (CA); Charles M. Lanning, Ottawa (CA)

(73) Assignee: Headwaters R & D, Inc., Ottawa (CA)

( * ) Notice: Subject to any disclaimer, the term of this patent is extended or adjusted under 35 U.S.C. 154(b) by 0 days.

(21) Appl. No.: 11/307,859

(22) Filed: Feb. 25, 2006

(65) Prior Publication Data
US 2006/0157399 A1 Jul. 20, 2006

Related U.S. Application Data

(62) Division of application No. 10/726,778, filed on Dec. 3, 2003, now abandoned.

(60) Provisional application No. 60/431,125, filed on Dec. 5, 2002.

(51) Int. Cl.
*B01D 24/18* (2006.01)
*B01D 35/02* (2006.01)

(52) U.S. Cl. ............................... 210/284; 210/336

(58) Field of Classification Search ............... 210/282, 210/284, 336, 283, 473, 477
See application file for complete search history.

(56) References Cited

U.S. PATENT DOCUMENTS 1,432,351 A * 10/1922 McGahan ............... 210/284
1,450,770 A * 4/1923 Phillip et al. ............ 210/336
2,359,985 A * 10/1944 Gordon .................. 210/336
5,076,922 A * 12/1991 DeAre .................... 210/282

FOREIGN PATENT DOCUMENTS

DE 3535679 A1 * 5/1987

* cited by examiner

*Primary Examiner*—Fred Prince
(74) *Attorney, Agent, or Firm*—Albert Peter Durigon

(57) ABSTRACT

A filter cartridge for a standalone point of use water purification device includes tandem first and second flow passageways containing flowthrough filter media that cooperate to provide opposing flow directions in the first and second flow passageways that reduce, if not eliminate, channeling, and provide self-wetting of the flowthrough filter media contained in the tandem first and second flow passageways, eliminating the need for post-use wetting steps.

1 Claim, 4 Drawing Sheets

FILTER CARTRIDGE FOR A STANDALONE POINT OF USE WATER PURIFICATION DEVICE

CROSS REFERENCE TO RELATED APPLICATIONS

This application is a division of U.S. Utility patent application Ser. No. 10/726,778 of the same inventive entity as herein, filed Dec. 3, 2003, abandoned, which claims the benefit of U.S. Provisional Application No. 60/431,125, filed Dec. 5, 2002.

FIELD OF THE INVENTION

This invention is drawn to the field of water purification, and more particularly, to a novel filter cartridge for a standalone point of use water purification device.

BACKGROUND OF THE INVENTION

To remove impurities from drinking water, standalone point of use water purification devices, such as pitcher purifiers or countertop units, utilize flowthrough filter media normally packaged in replaceable filter cartridges fitted inside the devices. Ion exchange and activated carbon is a typical flowthrough filter media.

As the water of a batch of water needing treatment passes through the filter cartridge of a standalone point of use water purification device, it contacts the ion exchange and activated carbon filter media, which absorbs impurities from the water flowing therethrough. The quantity of filter media contacted by the water and the water flow rate determine the absorption efficiency. Typically, filter cartridges having elongated profiles deep enough to allow pollutants to be absorbed by the filter media in the time it takes the water to flow through the filter have been employed.

The ion exchange and activated carbon filter media is contained in the elongated filter cartridges as a bed of closely-packed beads or grains, with a consistency of sand or coffee grounds. As the water flows therethrough, it takes the path of least resistance and makes its own channels through the filter bed. Such "channeling" action, however, leads to the undesirable result that "impurities" seep through the filter cartridge along with "purified" water, since the water that flows through the channels does not contact the filter media for enough time to allow effective absorption to take place.

To insure repeatable operation after use, the ion exchange and activated carbon filter media needs to remain wetted. In the usual case, this requirement has necessitated that the user take steps to insure the standalone point of use water purification device always contains enough water to keep the filter cartridge fitted therein at least partially submerged in water.

BRIEF SUMMARY OF THE INVENTION

It accordingly is one object of the present invention to disclose a filter cartridge for a standalone point of use water purification device that reduces if not eliminates the undesirable phenomenon of channeling.

It is another object of the present invention to disclose a filter cartridge for a standalone point of use water purification device that is self-wetting and thus is free from the need for undesirable post-use wetting steps.

It is a further object of the present invention to disclose a filter cartridge for a standalone point of use water purification device having a flat profile that, without necessitating use of a deep, elongated filter housing, exposes water to be treated to a quantity of filter media sufficient to absorb pollutants in the time it takes the water to flow through the filter media.

In general terms, the present invention contemplates a replaceable filter cartridge for a standalone point of use water purification device that includes a housing having water inlet and water outlet ports that is adapted for removable insertion into the standalone point of use water purification device, the housing having interior walls providing a flow path extending between the water inlet and outlet ports that includes first and second passageways containing flowthrough filter media adapted to operate in tandem such that water to be treated flows downwardly through the first passageway, and soaks upwardly through the second passageway, as it flows along the flow path between the inlet and outlet ports. Any number of first and second passageways adapted to operate in tandem may be employed without departing from the inventive concepts.

The first and second passageways adapted to operate in tandem expose water to be treated to an effective quantity of flowthrough filter media in the time it takes the water to move through the flow path without requiring physically elongated cartridges to obtain the same depth of exposure. The water that moves along the second, generally upward direction soaks upwardly through the filter media contained in the second passageway, which reduces if not eliminates channeling, and the opposing first and second flow directions provide self-wetting of the filter media contained in the first and second flow passageways, eliminating the need for post-use wetting.

In the presently preferred embodiment, the replaceable cartridge for a standalone point of use water purification device includes mating, interfitting top and bottom housing modules fastened in water-tight sealing relation. The top housing module includes a lid member having a slotted dome in fluid communication with a tube downwardly extending from the lid having an inside cylindrical wall providing said first passageway containing filter media. The bottom housing module includes a generally cup-shaped base member having a generally cylindrical inside wall providing, together with the generally cylindrical outside wall of the tube, an annular second passageway containing filter media. An external filter may be mounted to the dome of the lid member to provide pre-filtration, and inlet and outlet filters inside the cartridge prevent leakage of filter media and control flow rate.

In the presently preferred embodiment, the standalone point of use water purification device is a pitcher-type water purifier having a handle and pouring spout, the water outlet is located to the top and one side of the cartridge, and an alignment tab carried by the cartridge seats it with its water outlet located to the side of the pitcher away from its pouring spout to prevent spillage of water from the cartridge when the pitcher is dispensing water. A quick-release finger enables easy removable of the cartridge from the pitcher-type water purifier.

BRIEF DESCRIPTION OF THE DRAWINGS

These and other objects, inventive aspects and advantageous features of the filter cartridge for a standalone point of use water purification device of the present invention will become apparent as the invention becomes better understood by referring to the following, solely exemplary, detailed description of the presently preferred embodiments, and to the drawings, wherein.

DETAILED DESCRIPTION

Figure 1:
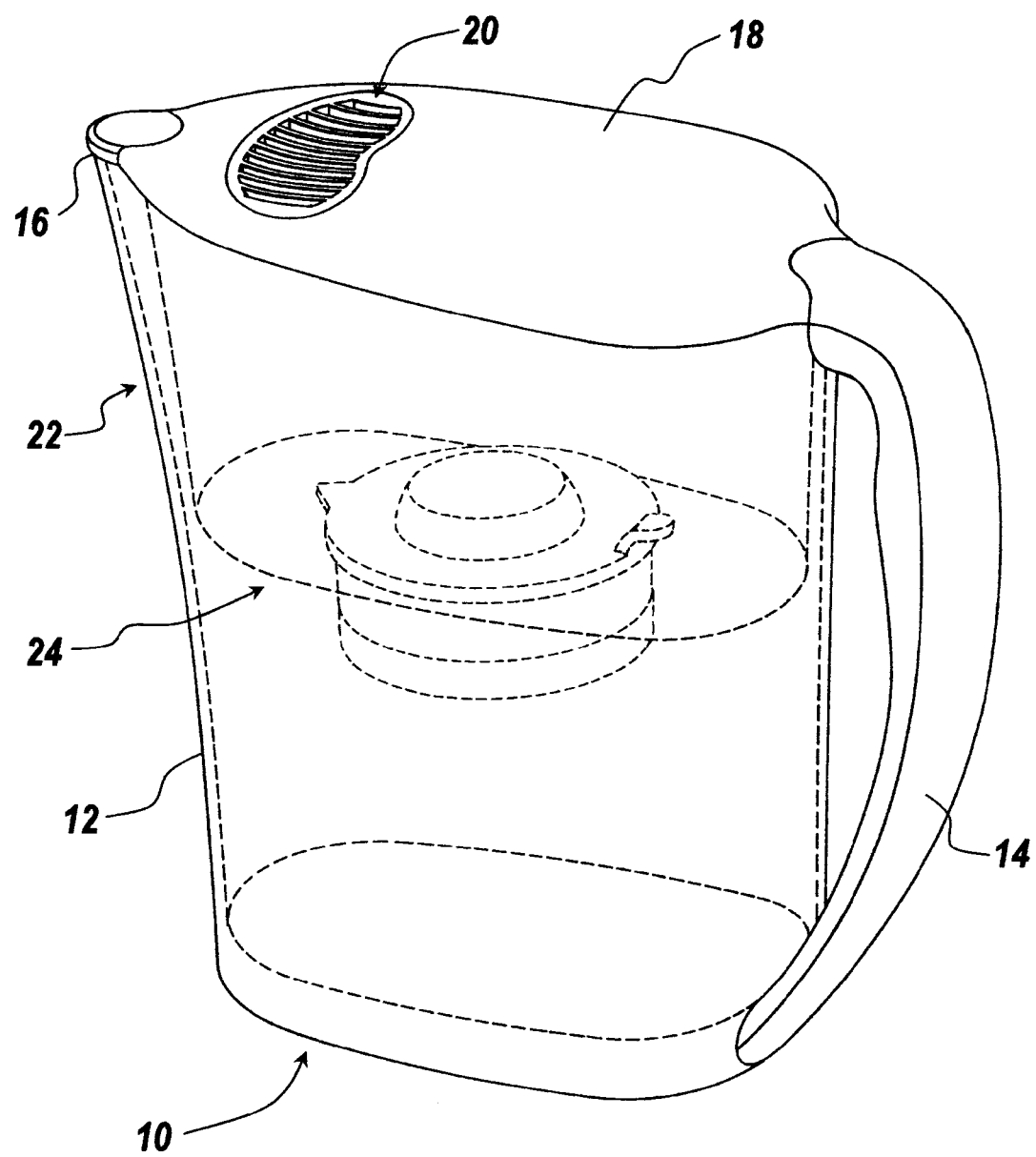
FIG. 1 is a perspective view of a standalone point of use water purification device equipped with a filter cartridge in accord with the present invention.

Referring now to FIG. 1, generally designated at 10 is a perspective view of a standalone point of use water purification device equipped with a filter cartridge in accord with the present invention. The water purification device 10 includes a pitcher 12 having a handle 14, pour spout 16 and removable lid 18 having a fill opening therethrough generally designated 20. A bucket generally designated 22 is mounted inside the pitcher 12 into which water to be purified is poured batchwise all at once. A filter cartridge generally designated 24 to be described containing flowthrough filter media is removably mounted in the bucket 22. The filter cartridge 24 absorbs pollutants from the water received batchwise in the bucket as it flows therethrough and into the basin of the pitcher 12. A filter cartridge adapted for removable insertion into a standalone point of use water purification device other than pitcher-type water purification devices such as standalone point of use countertop units may be employed without departing from the inventive concepts.

Figure 2:
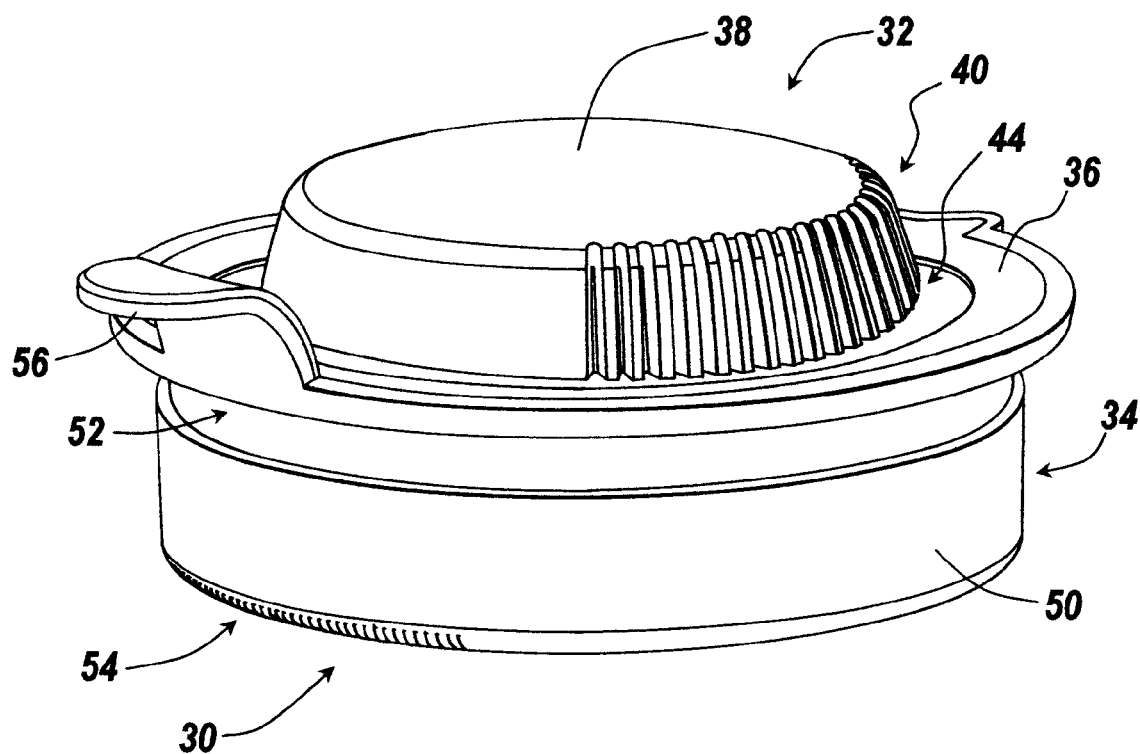
FIG. 2 is a perspective view of the back of the filter cartridge.
Figure 3:
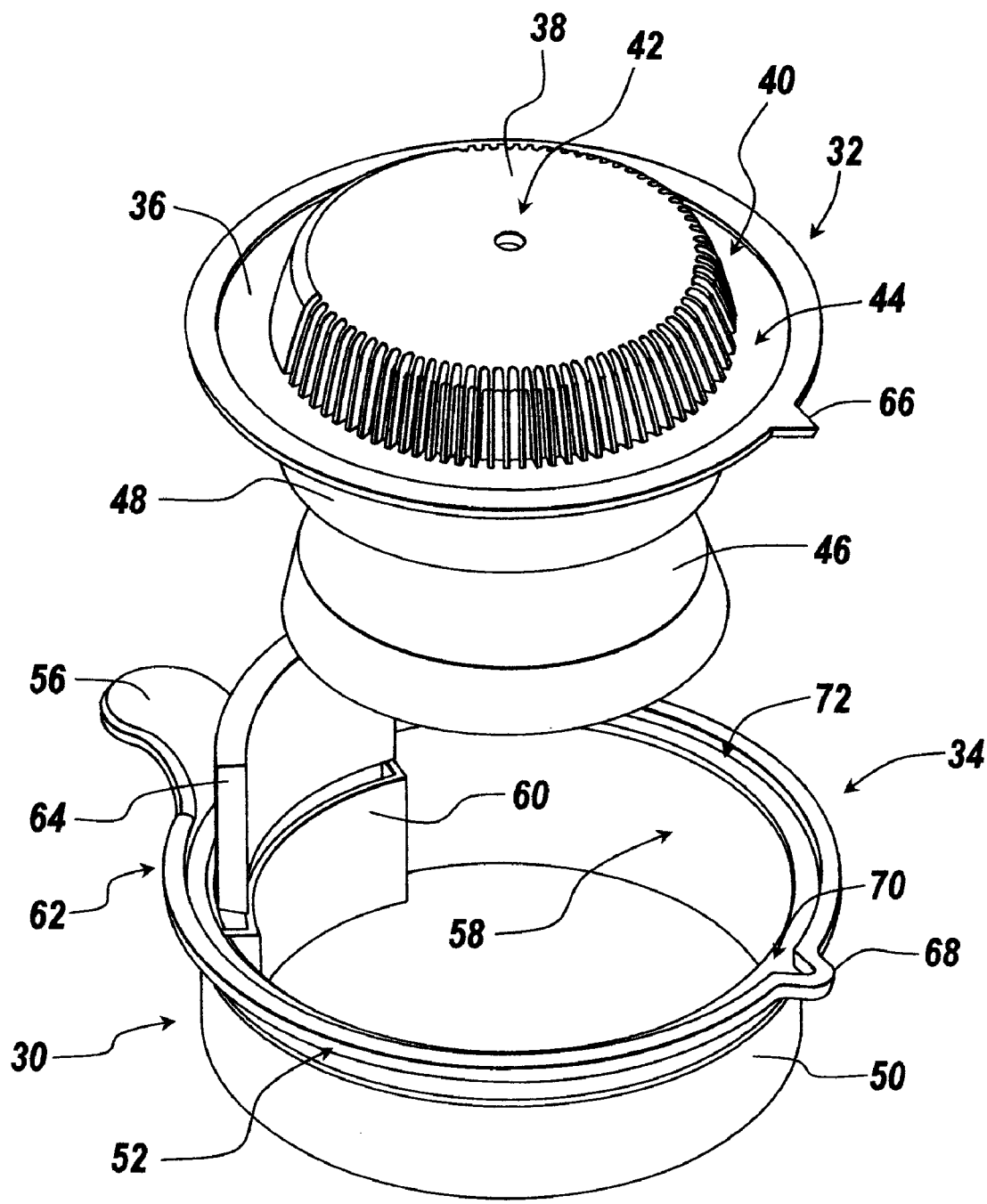
FIG. 3 is an exploded perspective view of the filter cartridge.

Referring now to FIGS. 2 and 3, generally designated at 30 is a filter cartridge in accord with the present invention. The filter cartridge 30 has a "flat," generally cylindrical profile wider than it is long and includes mating, interfitting top and bottom housing modules generally designated 32, 34 fastened in water-type sealing relation. The "flat" profile of the cartridge 30 does not cast "shadows" to a UV radiator when it is employed, for example, as part of a moving water processing module together with a still water processing module as disclosed in commonly assigned, co-pending United States utility patent application entitled Portable, Refillable Water Dispensing Serving Batches of Water Purified of Organic and Inorganic Pollutants, filed on even date herewith. Any filter cartridge adapted for removable insertion into a standalone point of use water purification device having other than a "flat," generally cylindrical profile may be employed without departing from the inventive concepts.

The top housing module 32 includes a generally cylindrical lid member 36 having a dome 38 provided with water inlet slots generally designated 40 about a major portion of its periphery. An external filter, such as a glass media filter, not shown, may be externally mounted to the top housing module 32 in a slot generally designated 42 of the dome 38 and seated in annular groove generally designated 44 of the lid 36 to provide pre-filtration of water to be treated before it enters the water inlets 40 of the dome 38 of the filter cartridge 30. An internal filter ring 46, such as of polyester fiber or polyester fabric, is mounted inside the dome 38 to prevent leakage of filter media and to control the flow rate of water through the cartridge 30. A generally cylindrical tube 48 in fluid communication with the water inlet slots 40 extends downwardly from the lid 36 of the top housing module 32.

The bottom housing module 34 includes a generally cylindrically-shaped base member 50 having an annular groove generally designated 52 receiving a sealing ring, not shown, and water outlet slots generally designated 54 located at the back of the base member 50. A quick-release finger 56 is provided for ease of handling. The base member 50 has an upstanding, generally cylindrical inside wall 58 about a major portion of its periphery, that, together with an upstanding spillover wall 60 inside and to the back of the base member 50, provide an outlet conduit generally designated 62 in fluid communication with the water outlet slots 54 of the bottom housing module 34. A pad filter 64, such as a porous polyester fiber filter pad, is mounted in the outlet conduit 62 to prevent leakage of filter media and to control flow rate through the filter cartridge 30.

The lid 36 of the top housing module 32 includes a cover alignment tab 66. The base member 50 of the bottom housing module 34 includes a cartridge alignment tab 68 having a cover alignment tab receiving groove generally designated 70. This ensures that the spillover wall 60 is located to the side of the pitcher away from its dispensing side, which prevents spillage of liquid thereout during pouring.

Ion exchange and activated carbon filter media, not shown, is poured into the bottom housing module 34 so as to substantially fill the cup-shaped base member 50 thereof. After the bottom housing module 34 has been filled with flowthrough filter media, it is covered by pressing the tube 48 downwardly into the contained filter media, filling the tube 48, until the lid 36 is seated into a groove generally designated 72 provided about the top of the base member 50. The lid 36 is then ultrasonically welded to the groove 72 joining the top and bottom housing module 32, 34 in water-tight sealing relation.

Figure 4:
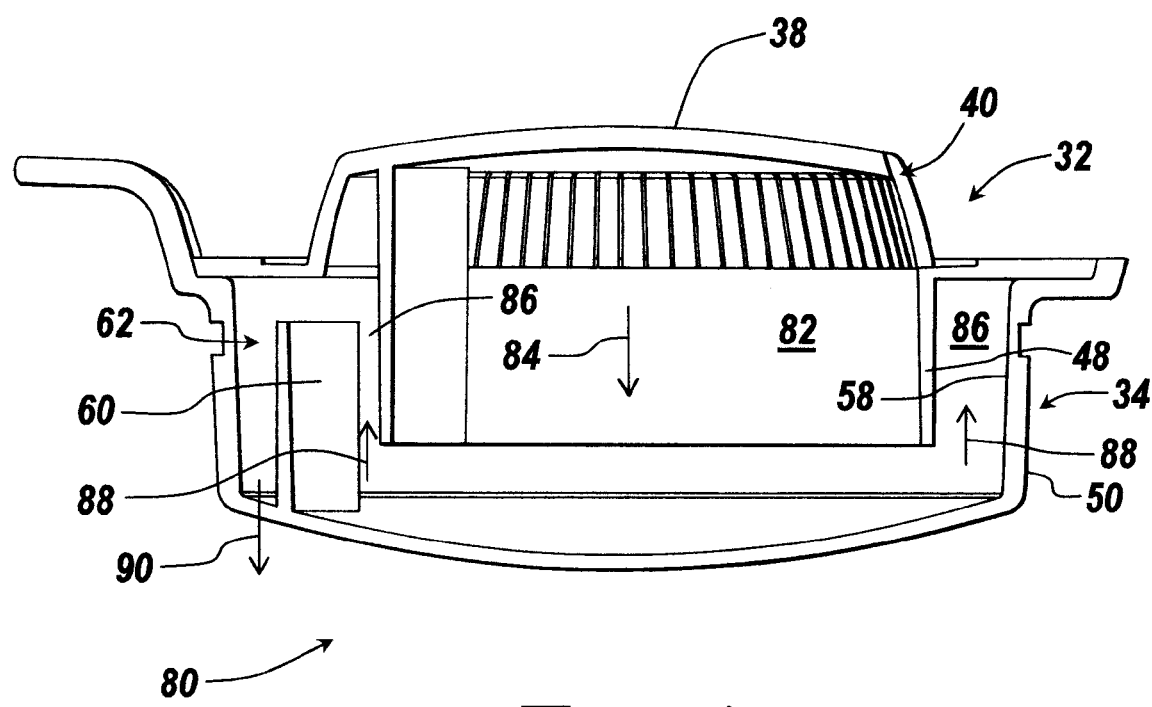
FIG. 4 is a longitudinal sectional view along the midsection of the filter cartridge that is useful in explaining its operation.

Referring now to FIG. 4, generally designated at 80 is a longitudinal sectional view along the midsection of the filter cartridge useful in explaining its operation. Water to be treated flows through water inlets 40 of the dome 38 of the top housing module 32 into a first passageway containing flowthrough filter media generally designated 82 provided by the inside cylindrical wall of the tube 48 through which the water moves along a first, generally downward direction by action of gravity as a schematically illustrated by arrow 84, and then flows through an annular second passageway containing flowthrough filter media generally designated 86 in fluid communication with the first passageway that is provided by the inside, generally cylindrical wall 58 of the base member 50 of the bottom housing module 34 and the generally cylindrical outside wall of the tube 48, through which the water moves along a second, generally upward direction as schematically illustrated by arrows 88. As the water in the second passageway spills over the spillover wall 60 of the base member 50, it passes though the conduit 62 and out the outlet slots of the bottom housing module 34 as schematically illustrated by arrow 90.

The water that moves along the second, generally upward direction 88 soaks upwardly, rather than drips through, the filter media contained in the second passageway 86, which helps to prevent channeling, and the opposing first and second flow directions 84, 88 and spillover wall 60, provide self-wetting of the filter media contained in the first and second flow passageways 82, 86, eliminating the need for post-use wetting.

It will be appreciated that the filter cartridge for a standalone point of use water purification device of the present invention is capable of a wide range of embodiments without departing from the inventive concepts.

What is claimed is:

1. A replaceable filter cartridge for a standalone point of use water purification device, comprising: a housing having water inlet and water outlet ports that is adapted for removable insertion into said standalone point of use water purification device, wherein said water inlet and outlet ports are vertically spaced, with said water inlet port located to the top and said water outlet port located to the bottom of said housing; said housing having interior walls providing a flow path extending between said water inlet and water outlet ports along which water to be treated moves through concentric first inner and second outer fluid flow passageways containing flowthrough filter media, and a third flow passageway, wherein said third flow passageway is connected in fluid communication between said second flow passageway and said water outlet port, wherein said first and second concentric flow passageways are adapted to operate in tandem such that said water to be treated first moves through said first inner passageway containing flow-through filter media in a first, generally downward direction, and then moves through said second outer passageway containing flow-through filter media in a second, generally upward direction, and wherein said third passageway in fluid communication with said second flow passageway receives the water as it flows out of the second passageway and moves it along said third passageway in a generally downward direction to said outlet port located to the bottom of said housing; wherein the water that moves along the second, generally upward direction soaks upwardly through the filter media contained in the second passageway, which reduces if not eliminates channeling, and the opposing first and second flow directions provide self-wetting of the filter media contained in the first and second flow passageways, eliminating the need for post-use wetting, and wherein an outlet filter is provided within said third passageway that is adapted to prevent leakage of said flow-through filter media in said concentric first inner and second outer flow passageways at said outlet port located to the bottom of said housing and to control rate of flow of treated water through said third passageway on its way out said outlet port located to the bottom of said housing, and therewith to control the dwell time of treated water moving through said concentric first inner and second outer passageways of said flow path extending between said water inlet and water outlet ports.

* * * * *